United States Patent
Ge et al.

(10) Patent No.: US 10,951,368 B2
(45) Date of Patent: Mar. 16, 2021

(54) DATA PROCESSING METHOD AND APPARATUS THEREOF

(71) Applicant: HUAWEI TECHNOLOGIES CO., LTD., Guangdong (CN)

(72) Inventors: Shibin Ge, Shanghai (CN); Hongzhe Shi, Shanghai (CN); Xiaoyan Bi, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/680,112

(22) Filed: Nov. 11, 2019

(65) Prior Publication Data

US 2020/0092058 A1 Mar. 19, 2020

Related U.S. Application Data

(63) Continuation of application No. PCT/CN2018/086476, filed on May 11, 2018.

(30) Foreign Application Priority Data

May 12, 2017 (CN) .......................... 201710336210.1

(51) Int. Cl.
*H04L 5/00* (2006.01)
*H04L 1/00* (2006.01)

(52) U.S. Cl.
CPC .......... *H04L 5/0023* (2013.01); *H04L 1/0071* (2013.01)

(58) Field of Classification Search
CPC ... H04L 5/0023; H04L 1/0071; H04L 5/0091; H04L 1/0025; H04L 1/0017; H04L 1/00; H04L 5/0007
See application file for complete search history.

(56) References Cited

U.S. PATENT DOCUMENTS 8,254,245 B2 * 8/2012 Kim ...................... H04L 5/0053
370/207
2009/0028264 A1 * 1/2009 Zhang .................. H04B 7/0671
375/267
(Continued)

FOREIGN PATENT DOCUMENTS

CN 104283630 A 1/2015
CN 105656596 A 6/2016
(Continued)

OTHER PUBLICATIONS

Huawei et al: "Codeword to layer mapping in NR", 3GPP Draft; R1-1705073,Apr. 2, 2017 (Apr. 2, 2017), XP051243204,total 10 pages.
(Continued)

*Primary Examiner* — Kenneth T Lam
(74) *Attorney, Agent, or Firm* — Womble Bond Dickinson (US) LLP

(57) ABSTRACT

Embodiments of this application disclose a data processing method and an apparatus thereof. The method includes: processing, by a network device, to-be-transmitted data to obtain a data distribution manner, where the processing includes at least one of interleaving processing and mapping processing that is performed in a mapping sequence; the data distribution manner is used to indicate distribution of data from a same code block; and when the processing includes only mapping processing performed in a mapping sequence, the mapping sequence does not include a mapping sequence in which space-domain mapping is first performed, frequency-domain mapping is then performed, and time-domain mapping is finally performed; sending, the to-be-transmitted data distributed in the data distribution manner; receiving, by a terminal device, processed to-be-transmitted data; and determining, a data distribution manner, and (Continued)

performing de-processing on the processed to-be-transmitted data in the data distribution manner, to obtain the to-be-transmitted data.

20 Claims, 10 Drawing Sheets

(56) References Cited

U.S. PATENT DOCUMENTS

| | | | | |
|---|---|---|---|---|
| 2010/0215007 | A1* | 8/2010 | Zhang | H04L 1/0071 |
| | | | | 370/329 |
| 2011/0134902 | A1* | 6/2011 | Ko | H04B 7/0691 |
| | | | | 370/344 |
| 2014/0079018 | A1* | 3/2014 | Seo | H04L 5/0007 |
| | | | | 370/330 |
| 2014/0105150 | A1* | 4/2014 | Kim | H04L 5/001 |
| | | | | 370/329 |
| 2015/0263825 | A1* | 9/2015 | Kim | H04L 1/0013 |
| | | | | 375/260 |
| 2017/0325208 | A1 | 11/2017 | Xin et al. | |
| 2017/0338906 | A1 | 11/2017 | Peng et al. | |

FOREIGN PATENT DOCUMENTS

| | | |
|---|---|---|
| CN | 105703882 A | 6/2016 |
| CN | 106160987 A | 11/2016 |
| EP | 3565152 A1 | 11/2019 |

OTHER PUBLICATIONS

ZTE, ZTE Microelectronics,"NR DL Control Channel Structure",3GPP TSG RAN WG1 Meeting #88bis ,R1-1704369, Spokane, USA, Apr. 3-7, 2017, total 5 pages.

3GPP TS 36.211 V1.0.0 (Mar. 2007),3rd Generation Partnership Project;Technical Specification Group Radio Access Network;Physical Channels and Modulation(Release 8), total 30 pages.

* cited by examiner

PDCCH   DMRS   Feedback result of a previous frame

DATA PROCESSING METHOD AND APPARATUS THEREOF

CROSS-REFERENCE TO RELATED APPLICATIONS

This application is a continuation of International Application No. PCT/CN2018/086476, filed on May 11, 2018, which claims priority to Chinese Patent Application No. 201710336210.1, filed on May 12, 2017, the disclosures of which are incorporated herein by reference in their entireties.

TECHNICAL FIELD

This application relates to the field of communications technologies, and in particular, to a data processing method and an apparatus thereof.

BACKGROUND

For a physical downlink channel processing procedure in a long term evolution (LTE) system, refer to FIG. 1. A transmit end performs scrambling and modulation processing on a codeword (CW) to obtain a modulated symbol, performs layer mapping processing on the modulated symbol, performs precoding processing on the modulated symbol obtained after the layer mapping processing, performs resource element (RE) mapping processing on a symbol obtained after the precoding processing, to map the symbol obtained after the precoding processing onto a time-frequency resource, and finally generates an orthogonal frequency division multiplex (OFDM) signal and sends the signal by using an antenna port.

Two modules, namely, a layer mapping module and a resource element mapping module, affect a codeword-to-layer mapping manner. A level of codeword-to-layer mapping may be classified into a bit level, a symbol level, and a code block (CB) level. Bit-level mapping occurs after a rate matching module, and symbol-level mapping and CB-level mapping occur after a modulation module. A codeword-to-layer mapping sequence is mainly a mapping sequence of a resource in three dimensions: a layer, a time domain, and a frequency domain, when the codeword is mapped to the layer. For example, the modulated symbol obtained after modulation processing is first mapped to the layer, then mapped to the frequency domain, and finally mapped to the time domain; or the modulated symbol obtained after modulation processing is first mapped to the layer, then mapped to the time domain, and finally mapped to the frequency domain. A mapping manner includes the codeword-to-layer mapping level, the codeword-to-layer mapping sequence, and interleaving.

In the LTE system, a codeword-to-layer mapping manner in which the mapping level is the symbol level, the mapping sequence is that layer mapping is first performed, frequency-domain mapping is then performed, and time-domain mapping is finally performed, and no interleaving is performed. This can implement a data distribution manner in which data is centrally distributed in time domain, that is, data of a same CB is centrally distributed in time domain. This facilitates fast demodulation. However, the codeword-to-layer mapping manner used in the LTE system can implement only the data distribution manner in which data is centrally distributed in time domain. For a new radio (NR) system having a relatively large quantity of application scenarios, it is very difficult for one data distribution manner to adapt to a plurality of application scenarios.

SUMMARY

A technical problem to be resolved in embodiments of this application is to provide a data processing method and an apparatus thereof. The method and the apparatus are applicable to a system having a plurality of application scenarios, and a data distribution manner in which data is centrally distributed and a data distribution manner in which data is de-centrally distributed can be achieved.

According to a first aspect, an embodiment of this application provides a data processing method, including:

processing, by a network device, to-be-transmitted data to obtain a data distribution manner, where the processing includes at least one of interleaving processing and mapping processing that is performed in a mapping sequence; the data distribution manner is used to indicate distribution of data from a same code block; and when the processing includes only mapping processing performed in a mapping sequence, the mapping sequence does not include a mapping sequence in which space-domain mapping is first performed, frequency-domain mapping is then performed, and time-domain mapping is finally performed; and sending, by the network device, the to-be-transmitted data distributed in the data distribution manner.

According to the first aspect of the embodiments of this application, the network device performs interleaving processing on the to-be-transmitted data, or performs mapping processing on the to-be-transmitted data in a mapping sequence, or performs interleaving processing on the to-be-transmitted data and performs mapping processing on the to-be-transmitted data in a mapping sequence. Different data distribution manners may be obtained for different processing manners. Therefore, a data distribution manner in which data is centrally distributed and a data distribution manner in which data is de-centrally distributed can be achieved, and may be applied to a system having a plurality of application scenarios.

In one embodiment, the data distribution manner may be classified into a time-domain centralized distribution manner and a time-domain decentralized distribution manner based on a time domain. The time-domain centralized distribution manner is used to indicate that data from a same code block is centrally distributed on at least one consecutive time domain symbol, and the time-domain decentralized distribution manner is used to indicate that data from a same code block is de-centrally distributed on a plurality of time domain symbols. The data distribution manner may be further classified into a space-domain centralized distribution manner and a space-domain decentralized distribution manner based on a space domain; and may be further classified into a frequency-domain centralized distribution manner and a frequency-domain decentralized distribution manner based on a frequency domain.

In one embodiment, the network device performs interleaving processing on the to-be-transmitted data, and performs mapping processing on the to-be-transmitted data in a mapping sequence in which frequency-domain mapping is performed before time-domain mapping, to obtain the data distribution manner; or the network device performs mapping processing on the to-be-transmitted data in a mapping sequence in which time-domain mapping is performed before frequency-domain mapping, to obtain a data distribution manner in which data is de-centrally distributed; or the network device performs interleaving processing on the to-be-transmitted data, and performs mapping processing on the to-be-transmitted data in a mapping sequence in which time-domain mapping is performed before frequency-domain mapping, to obtain a data distribution manner in which data is de-centrally distributed.

In one embodiment, the network device performs frequency-domain interleaving processing on the to-be-transmitted data, and performs mapping processing on the to-be-transmitted data in the mapping sequence in which frequency-domain mapping is performed before time-domain mapping, to obtain a data distribution manner in which data is centrally distributed. In this case, a frequency domain diversity gain can be obtained.

In one embodiment, the network device performs time-domain interleaving processing or time-frequency interleaving processing on the to-be-transmitted data, and performs mapping processing on the to-be-transmitted data in the mapping sequence in which frequency-domain mapping is performed before time-domain mapping, to obtain the data distribution manner in which data is de-centrally distributed.

There are three types of the interleaving processing: frequency-domain interleaving, time-domain interleaving, and time-frequency interleaving. When the processing includes the interleaving processing, the mapping sequence includes the sequence in which frequency-domain mapping is performed before time-domain mapping, and the sequence in which time-domain mapping is performed before frequency-domain mapping. When the processing does not include the interleaving processing, the mapping sequence does not include the sequence in which frequency-domain mapping is performed before time-domain mapping, and includes only the sequence in which time-domain mapping is performed before frequency-domain mapping. This is because when the processing does not include the interleaving processing, that the mapping sequence includes the sequence in which frequency-domain mapping is performed before time-domain mapping is a processing manner used in an LTE system.

The network device may obtain eight combinations depending on whether interleaving (no interleaving, frequency-domain interleaving, time-domain interleaving, and time-frequency interleaving) is performed and a mapping sequence (frequency-domain mapping is performed before time-domain mapping, or time-domain mapping is performed before frequency-domain mapping), to obtain different data distribution manners. A time-domain data distribution manner is used as an example, and the eight combinations and respective corresponding data distribution manners are as follows:

(1) a time-domain centralized distribution manner in which no interleaving is performed and the mapping sequence in which frequency-domain mapping is performed before time-domain mapping is used;

(2) a time-domain decentralized distribution manner in which no interleaving is performed and the mapping sequence in which time-domain mapping is performed before frequency-domain mapping is used;

(3) a time-domain centralized distribution manner in which frequency-domain interleaving is performed and the mapping sequence in which frequency-domain mapping is performed before time-domain mapping is used;

(4) a time-domain decentralized distribution manner in which frequency-domain interleaving is performed and the mapping sequence in which time-domain mapping is performed before frequency-domain mapping is used;

(5) a time-domain decentralized distribution manner in which time-domain interleaving is performed and the mapping sequence in which frequency-domain mapping is performed before time-domain mapping is used;

(6) a time-domain decentralized distribution manner in which time-domain interleaving is performed and the mapping sequence in which time-domain mapping is performed before frequency-domain mapping is used;

(7) a time-domain decentralized distribution manner in which time-frequency interleaving is performed and the mapping sequence in which frequency-domain mapping is performed before time-domain mapping is used; and (8) a time-domain decentralized distribution manner in which time-frequency interleaving is performed and the mapping sequence in which time-domain mapping is performed before frequency-domain mapping is used.

Manner (1) is the processing manner used in the LTE system and the data distribution manner obtained in the processing manner. A frequency domain diversity gain may be obtained by using manner (3) instead of manner (1).

In one embodiment, the network device performs interleaving processing on the to-be-transmitted data before performing layer mapping, to be specific, performs interleaving processing on the to-be-transmitted data between performing modulation processing and performing layer mapping processing.

In one embodiment, the network device performs interleaving processing on the to-be-transmitted data after performing layer mapping, to be specific, performs interleaving processing on the to-be-transmitted data between performing layer mapping processing and performing precoding processing.

In one embodiment, the network device performs interleaving processing on the to-be-transmitted data when performing layer mapping.

In one embodiment, the network device performs interleaving processing on the to-be-transmitted data when performing resource element mapping.

In one embodiment, the network device performs, when performing resource element mapping, mapping processing on the to-be-transmitted data in the mapping sequence in which time-domain mapping is performed before frequency-domain mapping.

In one embodiment, the network device indicates the data distribution manner by using downlink control information (DCI), radio resource control (RRC) signaling, a media access control (MAC) layer control element (CE), or the like.

According to a second aspect of the embodiments of this application, a network device is provided. The network device has functions for implementing behavior of the network device in the method in the first aspect. The functions may be implemented by using hardware, or implemented by hardware executing corresponding software. The hardware or the software includes one or more modules corresponding to the functions.

In one embodiment, the network device includes a processing unit and a sending unit. The processing unit is configured to process to-be-transmitted data to obtain a data distribution manner, where the processing includes at least one of interleaving processing and mapping processing that is performed in a mapping sequence; the data distribution manner is used to indicate distribution of data from a same code block; and when the processing includes only mapping processing performed in a mapping sequence, the mapping sequence does not include a mapping sequence in which space-domain mapping is first performed, frequency-domain mapping is then performed, and time-domain mapping is finally performed; and the sending unit is configure to send the to-be-transmitted data distributed in the data distribution manner.

In one embodiment, the network device includes a processor and a transceiver. The processor is configured to process to-be-transmitted data to obtain a data distribution manner, where the processing includes at least one of interleaving processing and mapping processing that is performed in a mapping sequence; the data distribution manner is used to indicate distribution of data from a same code block; and when the processing includes only mapping processing performed in a mapping sequence, the mapping sequence does not include a mapping sequence in which space-domain mapping is first performed, frequency-domain mapping is then performed, and time-domain mapping is finally performed; and the transceiver is configure to send the to-be-transmitted data distributed in the data distribution manner.

Based on a same inventive concept, for a problem-resolving principle and beneficial effects of the network device, refer to the method in the first aspect and beneficial effects brought by the method. For implementation of the network device, refer to implementation of the method on the network device side in the first aspect. No repeated description is provided.

According to a third aspect, an embodiment of this application provides a data processing method, including:

receiving, by a terminal device, processed to-be-transmitted data;

determining, by the terminal device, a data distribution manner, where the data distribution manner is used to indicate distribution of data from a same code block; and performing, by the terminal device, de-processing on the processed to-be-transmitted data in the data distribution manner, to obtain the to-be-transmitted data, where the de-processing includes at least one of de-interleaving processing performed on the processed to-be-transmitted data and demapping processing performed in a demapping sequence; and when the de-processing includes only demapping processing performed in a demapping sequence, the demapping sequence does not include a demapping sequence in which space-domain demapping is first performed, frequency-domain demapping is then performed, and time-domain demapping is finally performed.

According to the third aspect of the embodiments of this application, the terminal device performs de-processing in a data distribution manner used by a network device, to obtain the to-be-transmitted data.

In one embodiment, the data distribution manner may be classified into a time-domain centralized distribution manner and a time-domain decentralized distribution manner based on a time domain. The time-domain centralized distribution manner is used to indicate that data from a same code block is centrally distributed on at least one consecutive time domain symbol, and the time-domain decentralized distribution manner is used to indicate that data from a same code block is de-centrally distributed on a plurality of time domain symbols. The data distribution manner may be further classified into a space-domain centralized distribution manner and a space-domain decentralized distribution manner based on a space domain; and may be further classified into a frequency-domain centralized distribution manner and a frequency-domain decentralized distribution manner based on a frequency domain.

In one embodiment, the performing, by the terminal device, de-processing on the processed to-be-transmitted data in the data distribution manner includes:

processing, by the terminal device in the data distribution manner, the processed to-be-transmitted data in a demapping sequence in which frequency-domain demapping is performed before time-domain demapping, and performing de-interleaving processing; or processing, by the terminal device in the data distribution manner, the processed to-be-transmitted data in a demapping sequence in which time-domain demapping is performed before frequency-domain demapping; or processing, by the terminal device in the data distribution manner, the processed to-be-transmitted data in a demapping sequence in which time-domain demapping is performed before frequency-domain demapping, and performing de-interleaving processing.

The terminal device performs corresponding de-processing in a processing manner used by the network device.

A fourth aspect of the embodiments of this application provides a terminal device. The terminal device has functions for implementing behavior of the terminal device in the method in the third aspect. The functions may be implemented by using hardware, or implemented by hardware executing corresponding software. The hardware or the software includes one or more modules corresponding to the functions.

In one embodiment, the terminal device includes a receiving unit and a processing unit. The receiving unit is configured to receive processed to-be-transmitted data; the processing unit is configured to determine a data distribution manner, where the data distribution manner is used to indicate distribution of data from a same code block; the processing unit is further configured to perform de-processing on the processed to-be-transmitted data in the data distribution manner, to obtain the to-be-transmitted data, where the de-processing includes at least one of de-interleaving processing performed on the processed to-be-transmitted data and demapping processing performed in a demapping sequence; and when the de-processing includes only demapping processing performed in a demapping sequence, the demapping sequence does not include a demapping sequence in which space-domain demapping is first performed, frequency-domain demapping is then performed, and time-domain demapping is finally performed.

In one embodiment, the terminal device includes a processor and a transceiver. The transceiver is configured to receive processed to-be-transmitted data; the processor is configured to determine a data distribution manner, where the data distribution manner is used to indicate distribution of data from a same code block; the processor is further configured to perform de-processing on the processed to-be-transmitted data in the data distribution manner, to obtain the to-be-transmitted data, where the de-processing includes at least one of de-interleaving processing performed on the processed to-be-transmitted data and demapping processing performed in a demapping sequence; and when the de-processing includes only demapping processing performed in a demapping sequence, the demapping sequence does not include a demapping sequence in which space-domain demapping is first performed, frequency-domain demapping is then performed, and time-domain demapping is finally performed.

Based on a same inventive concept, for a problem-resolving principle and beneficial effects of the terminal device, refer to the method in the third aspect and beneficial effects brought by the method. For implementation of the terminal device, refer to implementation of the method on the terminal device side in the second aspect. No repeated description is provided.

According to a fifth aspect, an embodiment of this application provides a computer-readable storage medium, including an instruction. When the instruction is run on a computer, the computer is enabled to perform the method performed by the network device in the first aspect.

According to a sixth aspect, an embodiment of this application provides a computer-readable storage medium, including an instruction. When the instruction is run on a computer, the computer is enabled to perform the method on the terminal device side in the third aspect.

According to the embodiments of this application, the network device performs interleaving processing on the to-be-transmitted data, or performs mapping processing on the to-be-transmitted data in a mapping sequence, or performs interleaving processing on the to-be-transmitted data and performs mapping processing on the to-be-transmitted data in a mapping sequence. Different data distribution manners may be obtained for different processing manners. Therefore, a data distribution manner in which data is centrally distributed and a data distribution manner in which data is de-centrally distributed can be achieved, and may be applied to a system having a plurality of application scenarios.

BRIEF DESCRIPTION OF DRAWINGS

To describe technical solutions in embodiments of this application or in the background more clearly, the following describes the accompanying drawings used in conjunction with the detailed description for describing the embodiments of this application or the background.

DESCRIPTION OF EMBODIMENTS

The following describes embodiments of this application with reference to the accompanying drawings in the embodiments of this application.

Figure 2:
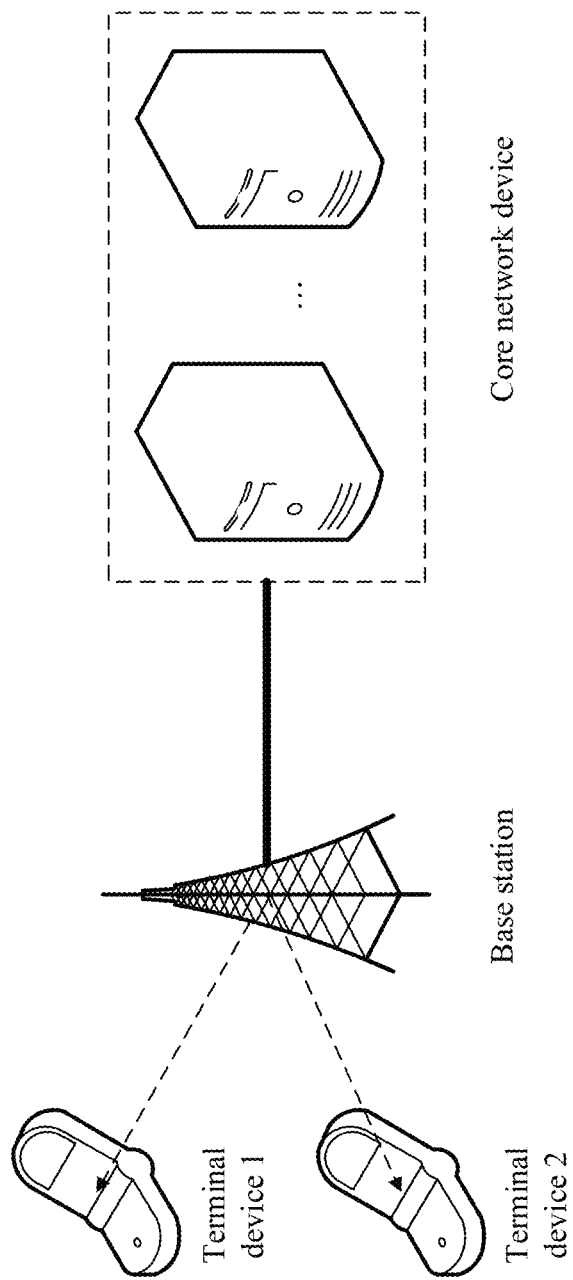
FIG. 2 is a block diagram of an application scenario according to an embodiment of this application.

The embodiments of this application may be applied to a wireless communications system. The wireless communications system usually includes cells, and each cell includes one base station (BS). As shown in FIG. 2, a base station provides a communications service for a plurality of terminal devices, and the base station is connected to a core network device. The base station includes a baseband unit (BBU) and a remote radio unit (RRU). The BBU and the RRU may be placed at different places. For example, the RRU is remote and placed in an open area having heavy-traffic, and the BBU is placed in a central equipment room. Alternatively, the BBU and the RRU may be placed in a same equipment room. Alternatively, the BBU and the RRU may be different components in a same rack.

It should be noted that the wireless communications system in the embodiments of the present invention includes, but is not limited to, a narrowband internet of things (NB-IoT) system, a global system for mobile communications (GSM), an enhanced data rate for GSM evolution system (EDGE), a wideband code division multiple access (WCDMA) system, a code division multiple access 2000 (CDMA 2000) system, a time division-synchronous code division multiple access (TD-SCDMA) system, a long term evolution (LTE) system, a 5G system, and a future mobile communications system.

The base station in the embodiments of this application is an apparatus that is deployed in a radio access network and that is configured to provide a wireless communication function for the terminal device. The base station may include various forms of macro base stations, micro base stations (also referred to as a small cell), relay stations, access points, transport access points (Transmission Reception point or TRP), and the like. In systems that use different radio access technologies, names of a device that has a base station function may be different. For example, in an LTE system, the device is referred to as an evolved NodeB (eNB or eNodeB), and in a 3rd generation (3G) system, the device is referred to as a NodeB (NB). For ease of description, in all the embodiments of this application, all the foregoing apparatuses that provide a wireless communication function for the terminal device are referred to as a network device.

The terminal device in the embodiments of this application may include various handheld devices, vehicle-mounted devices, wearable devices, or computing devices that have a wireless communication function, or other processing devices connected to a wireless modem. The terminal device may also be referred to as a mobile station (MS), a terminal, or may include a subscriber unit, a cellular phone, a smartphone, a wireless data card, a personal digital assistant (PDA) computer, a tablet computer, a wireless modem, a handheld device, a laptop computer, a machine type communication (MTC) terminal, or the like. For ease of description, the devices described above are collectively referred to as the terminal device in all the embodiments of this application.

A data distribution manner in the embodiments of this application is used to indicate distribution of data from a same code block. The data distribution manner may be used to indicate distribution of data from a same code block in a time domain dimension. For example, a data distribution manner in which data is centrally distributed in time domain is used to indicate that data from a same code block is centrally distributed on at least one consecutive time domain symbol, and a data distribution manner in which data is de-centrally distributed in time domain is used to indicate that data from a same code block is de-centrally distributed on a plurality of time domain symbols. The data distribution manner may be further used to indicate distribution of data from a same code block in a space domain dimension, or may be used to indicate distribution of data from a same code block in a frequency domain dimension. In all the embodiments of this application, the data distribution manner in which data is centrally distributed in time domain and the data distribution manner in which data is de-centrally distributed in time domain are used as examples for description, and distribution for the space domain dimension and the frequency domain dimension may be deduced by analogy.

Figure 3:
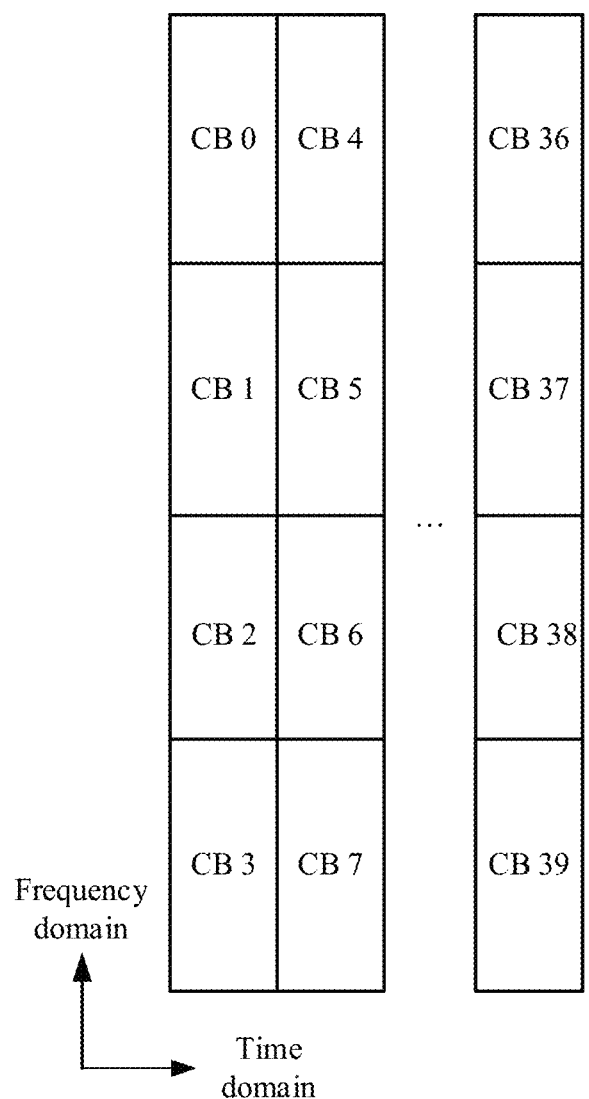
FIG. 3 is a diagram of data distribution in a time-domain centralized distribution manner.
Figure 4:
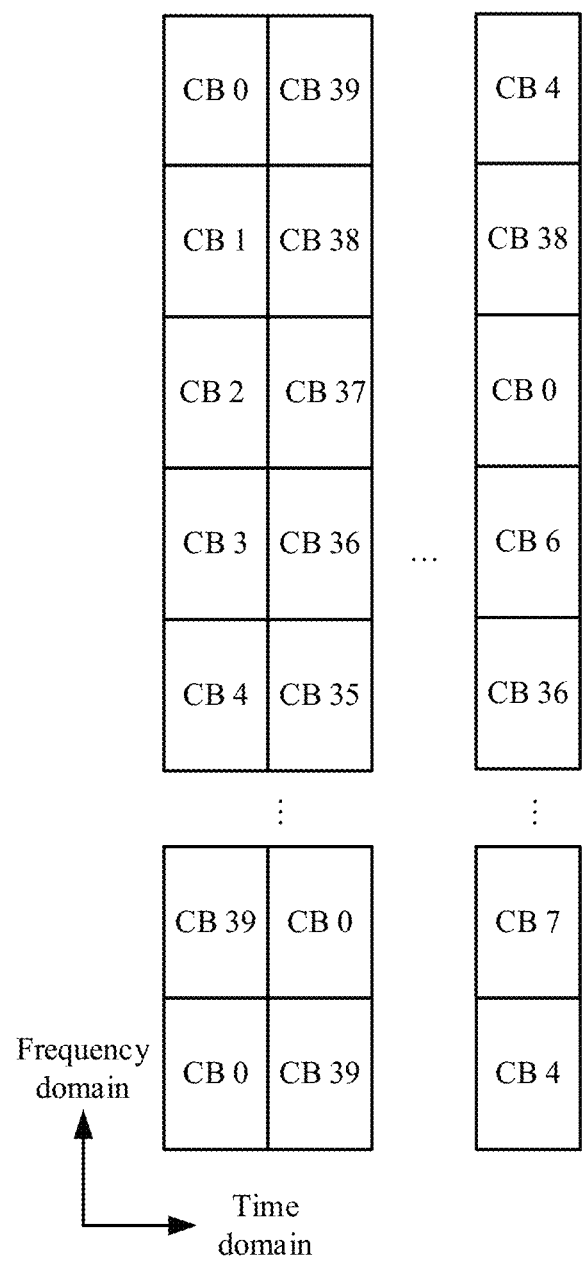
FIG. 4 is a diagram of data distribution in a time-domain decentralized distribution manner.

FIG. 3 is a diagram of data distribution in a time-domain centralized distribution manner. Each CB is distributed on one or more consecutive time domain symbols as centrally as possible, to ensure that a receive end performs fast demodulation on data. FIG. 4 is a diagram of data distribution in a time-domain decentralized distribution manner. Each CB is placed on different time domain symbols as de-centrally as possible. For example, in FIG. 4, a CB 0 is de-centrally placed on a first time domain symbol, the second time domain symbol, and the last time domain symbol, so that transmission performance can be greatly improved.

It should be understood that, in the time-domain centralized distribution manner, data of a same CB may be distributed on one time domain symbol. When one time domain symbol is insufficient, remaining data of the CB is placed on a neighboring time domain symbol, and so on. Therefore, when the time-domain centralized distribution manner is used, the data of the same CB is distributed on at least one consecutive time domain symbol. In the time-domain decentralized distribution manner, although data of a same CB may be de-centrally placed, the data from the same CB is not necessarily decentralized to all available time domain symbols. For example, there are ten available time domain symbols in total, and one CB may be de-centrally placed on only three time domain symbols, five time domain symbols, or eight time domain symbols, all of which should belong to the time-domain decentralized distribution manner in this embodiment of this application.

The time-domain decentralized distribution manner may have the following three manners:

a first time-domain decentralized distribution manner, used to indicate that data from a same code block is de-centrally distributed on all time domain symbols in a resource unit, where the resource unit is a basic unit for scheduling a user to perform resource allocation;

a second time-domain decentralized distribution manner, used to indicate that data from a same code block is de-centrally distributed on all time domain symbols of a same slot in the resource unit; and a third time-domain decentralized manner, used to indicate that data from a same code block is de-centrally distributed on N time domain symbols in the resource unit, where N is an integer greater than 1.

Specifically, the data distribution manner in which data is de-centrally distributed in time domain may include different decentralization degrees, and the decentralization degree may be measured by using a quantity of time domain symbols on which data from a same CB is distributed. Data from a same CB may be de-centrally distributed on all time domain symbols in a resource unit, or may be de-centrally distributed on all time domain symbols of a same slot in the resource unit, or may be de-centrally distributed on some time domain symbols in the resource unit. This is not limited in this embodiment of this application. It should be understood that the resource unit (RU) may be used as a basic unit for scheduling the user to perform resource allocation. One resource unit occupies a plurality of consecutive subcarriers in frequency domain and a plurality of consecutive symbols (OFDM symbols) in time domain.

A data processing method provided in an embodiment of this application is applied to an NR system, and is mainly applied to an NR system having a plurality of application scenarios. The plurality of application scenarios may include, but are not limited to, an enhanced mobile broadband (eMBB) scenario, an ultra-reliable and low-latency communication (uRLLC) scenario, a massive machine type communication (mMTC) scenario, and the like. The application scenario may be that a network device determines, based on a channel change status of a terminal device, that the terminal device is currently in a high-speed scenario or a low-speed scenario. This is not limited in this embodiment of this application.

According to the embodiments of this application, a data distribution manner in which data is centrally distributed and a data distribution manner in which data is de-centrally distributed can be achieved, to meet requirements of various application scenarios in the NR system.

The data processing method provided in this embodiment of this application is described below.

Figure 5:
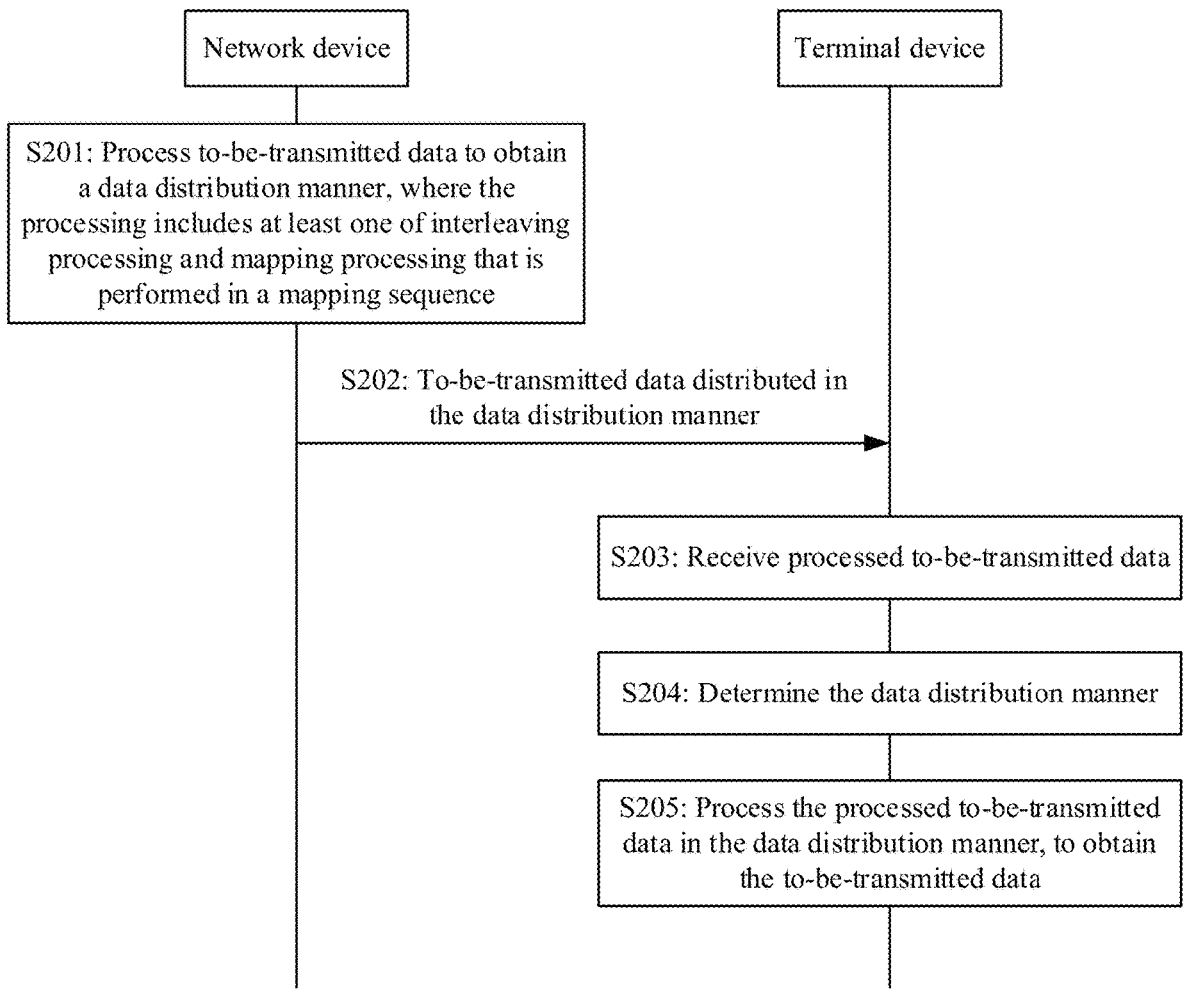
FIG. 5 is a flowchart of a data processing method according to an embodiment of this application.

FIG. 5 is a flowchart of a data processing method according to an embodiment of this application. The method is described from a perspective of interaction between a network device and a terminal device, and the method may include, but is not limited to, the following operations.

Operation S201: The network device processes to-be-transmitted data to obtain a data distribution manner, where the processing includes at least one of interleaving processing performed on the to-be-transmitted data and mapping processing performed in a mapping sequence, and the data distribution manner is used to indicate distribution of data from a same code block.

The data distribution manner is used to indicate that data from a same code block is centrally distributed on at least one consecutive time domain symbol, that is, a time-domain centralized distribution manner. Alternatively, the data distribution manner is used to indicate that data from a same code block is de-centrally distributed on a plurality of time domain symbols, that is, a time-domain decentralized distribution manner.

In an LTE system, a codeword-to-layer mapping manner having a mapping sequence in which layer mapping (space-domain mapping) is first performed, frequency-domain mapping is then performed, and time-domain mapping is finally performed is used, and no interleaving is performed. In this case, the data distribution manner in which data is centrally distributed in time domain can be achieved, but only this data distribution manner can be achieved. In this embodiment of this application, the network device performs interleaving processing on the to-be-transmitted data, or performs mapping processing on the to-be-transmitted data in a mapping sequence, or performs interleaving processing on the to-be-transmitted data and performs mapping processing on the to-be-transmitted data in a mapping sequence. In this case, the data distribution manner in which data is centrally distributed in time domain can be achieved, and a data distribution manner in which data is de-centrally distributed in time domain, a data distribution manner in which data is centrally distributed in space domain, a data distribution manner in which data is de-centrally distributed in space domain, and the like can also be achieved.

The mapping sequence may be a sequence of mapping performed in three dimensions: a space domain, a time domain, and a frequency domain. Space-domain mapping is mapping performed by a layer mapping module shown in FIG. 1, and time-domain mapping and frequency-domain mapping are mapping performed by a resource element mapping module shown in FIG. 1. It can be learned from FIG. 1 that space-domain mapping is performed before time-frequency mapping. In this embodiment of this application, a mapping sequence in three dimensions may not be limited. For example, frequency-domain mapping may be first performed, time-domain mapping is then performed, and space-domain mapping is finally performed.

It should be noted that, when only mapping processing is performed in a mapping sequence, the mapping sequence in this embodiment of this application does not include the mapping sequence in which space-domain mapping is first performed, frequency-domain mapping is then performed, and time-domain mapping is finally performed, in other words, does not include the mapping sequence used in an LTE system.

In this embodiment of this application, an example in which space-domain mapping is performed before time-frequency mapping is used for description, and a sequence of time-domain mapping and frequency-domain mapping is mainly described.

Figure 1:
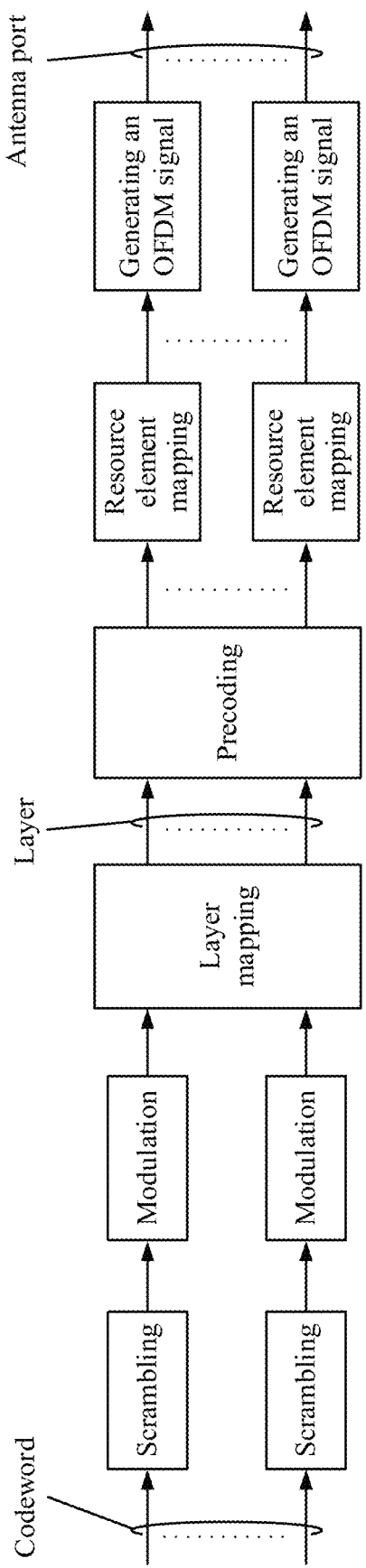
FIG. 1 is a block diagram of a physical downlink channel processing procedure in an LTE system.

That no interleaving (No interleaving) is performed in the LTE system means that a sequence of modulated symbols in a codeword or a code block is unchanged after being processed by the modulation module shown in FIG. 1.

Interleaving manners in this embodiment of this application may include frequency-domain interleaving, time-domain interleaving, and time-frequency interleaving. The following describes the three interleaving manners.

Similar to a resource block (RB) and an RB pair in the LTE standard, this application provides a resource unit. The resource unit may be used as a basic unit for scheduling a user to perform resource allocation. The resource unit occupies a plurality of consecutive subcarriers in frequency domain and a plurality of consecutive symbols (OFDM symbols) in time domain.

It is assumed that a scheduled resource has N OFDM symbols in time domain, and a quantity of subcarriers that can be used for data transmission (a physical downlink shared channel (PDSCH)) in an $n^{th}$ OFDM symbol is Pn.

Frequency-domain interleaving (F interleaving) is interleaving of each OFDM symbol. In this type of interleaving, a CW is divided into N parts, each part has Pn modulated symbols, and then a sequence of modulated symbols in each part is changed. One part is used as an example, and a sequence of the Pn modulated symbols in this part is changed (values of Pn and N are described above).

The N OFDM symbols in the resource unit are divided into Q parts ($1 \leq Q < N$). It is assumed that a $j^{th}$ part has Nj ($j=0, \ldots, (Q-1)$) OFDM symbols. If j=0, a quantity of subcarriers used for data transmission in this part is $$\sum_{i=1}^{N_0} P_i;$$

or if j>0, a quantity of subcarrier used for data transmission in the $j^{th}$ part is $$\sum_{i=N_{j-1}}^{N_j} P_i.$$

Time-frequency interleaving (F+T interleaving) is a type of cross-OFDM symbol interleaving in which a CW is divided into Q parts ($1 \leq Q < N$). In each part, a sequence of modulated symbols is changed. After time-frequency interleaving is performed, sequences of modulated symbols from different CBs are also alternated within a quantity of modulated symbols corresponding to each OFDM symbol in a $j^{th}$ part.

Time-domain interleaving (T interleaving) is also a type of cross-OFDM symbol interleaving in which a CW is divided into Q parts ($1 \leq Q < N$). In each part, a sequence of modulated symbols is changed. Different from time-frequency interleaving, after time-domain interleaving is used, modulated symbols from different CBs are sequentially arranged within a quantity of modulated symbols corresponding to each OFDM symbol in a $j^{th}$ part, and sequences are not alternated.

According to a mapping sequence in which frequency-domain mapping is performed before time-domain mapping in the LTE system, modulated symbols processed by a precoding module shown in FIG. 1 are placed sequentially on subcarriers of the first OFDM symbol that can be used for data transmission first, after the first OFDM symbol that can be used for data transmission is completed, are placed on subcarriers of the second OFDM symbol that can be used for data transmission, and after the second OFDM symbol that can be used for data transmission is completed, are then placed on subcarriers of the third OFDM symbol that can be used for data transmission. Data mapping of all OFDM symbols is sequentially completed.

In this embodiment of this application, a mapping sequence in which frequency-domain mapping is performed before time-domain mapping is the same as that in the LTE system.

According to a mapping sequence in which time-domain mapping is performed before frequency-domain mapping in this embodiment of this application, modulated symbols processed by the precoding module shown in FIG. 1 are placed sequentially on all OFDM symbols corresponding to the first carrier (where the modulated symbols are not placed on an OFDM symbol that is not used for a PDSCH) first, and are then placed on all OFDM symbols corresponding to the second subcarrier (where the modulated symbols are not placed on an OFDM symbol that is not used for the PDSCH). Data mapping of all subcarriers is sequentially completed.

In one embodiment, the network device performs interleaving processing on the to-be-transmitted data, and performs mapping processing on the to-be-transmitted data in the mapping sequence in which frequency-domain mapping is performed before time-domain mapping, thereby obtaining the data distribution manner. In this case, the mapping sequence is the mapping sequence in which frequency-domain mapping is performed before time-domain mapping in the LTE system. If the network device performs frequency-domain interleaving processing on the to-be-transmitted data, and performs mapping processing on the to-be-transmitted data in the mapping sequence in which frequency-domain mapping is performed before time-domain mapping, a data distribution manner in which data is centrally distributed in time domain can be obtained. A frequency domain diversity gain can be obtained through frequency-domain interleaving instead of the processing in which no interleaving is performed in the LTE system. If the network device performs time-frequency interleaving processing or time-domain interleaving processing on the to-be-transmitted data, and performs mapping processing on the to-be-transmitted data in the mapping sequence in which frequency-domain mapping is performed before time-domain mapping, a data distribution manner in which data is de-centrally distributed in time domain can be obtained. If time-domain interleaving processing is performed, a time domain diversity gain can be obtained; or if time-frequency interleaving processing is performed, a time domain diversity gain and a frequency domain diversity gain can be obtained.

In one embodiment, the network device performs mapping processing on the to-be-transmitted data in the mapping sequence in which time-domain mapping is performed before frequency-domain mapping, and no interleaving is performed in this case, so that the data distribution manner in which data is de-centrally distributed in time domain can be obtained. In this embodiment, a time diversity gain can be obtained.

In one embodiment, the network device performs interleaving processing on the to-be-transmitted data, and performs mapping processing on the to-be-transmitted data in the mapping sequence in which time-domain mapping is performed before frequency-domain mapping, and the data distribution manner in which data is de-centrally distributed in time domain can be obtained. If frequency-domain interleaving processing is performed, a time domain diversity gain and a frequency domain diversity gain can be obtained; or if time-domain interleaving processing is performed, a time domain diversity gain can be obtained; or if time-frequency interleaving processing is performed, a time domain diversity gain and a frequency domain diversity gain can be obtained.

Different data distribution manners may be achieved when different interleaving cases and different mapping sequences are used. For details, refer to the following Table 1.

TABLE 1

| Number | Interleaving processing | Mapping sequence | Data distribution manner |
|---|---|---|---|
| 1 | No interleaving | Frequency-domain mapping is performed before time-domain mapping | Time-domain centralized distribution |
| 2 | No interleaving | Time-domain mapping is performed before frequency-domain mapping | Time-domain decentralized distribution |
| 3 | Frequency-domain interleaving | Frequency-domain mapping is performed before time-domain mapping | Time-domain centralized distribution |
| 4 | Frequency-domain interleaving | Time-domain mapping is performed before frequency-domain mapping | Time-domain decentralized distribution |
| 5 | Time-domain interleaving | Frequency-domain mapping is performed before time-domain mapping | Time-domain decentralized distribution |
| 6 | Time-domain interleaving | Time-domain mapping is performed before frequency-domain mapping | Time-domain decentralized distribution |
| 7 | Time-frequency interleaving | Frequency-domain mapping is performed before time-domain mapping | Time-domain decentralized distribution |
| 8 | Time-frequency interleaving | Time-domain mapping is performed before frequency-domain mapping | Time-domain decentralized distribution |

The number 1 corresponds to the mapping processing method and the data distribution manner in the LTE system; the number 3, the number 5, and the number 7 correspond to the foregoing first embodiment; the number 2 corresponds to the second embodiment; and the number 4, the number 6, and the number 8 correspond to the foregoing third embodiment.

Operation S202: The network device sends the to-be-transmitted data distributed in the data distribution manner; and in one embodiment, the network device sends the to-be-transmitted data distributed in the data distribution manner to the terminal device.

Specifically, after performing the processing and obtaining the data distribution manner, the network device may further obtain the to-be-transmitted data distributed in the data distribution manner, for example, may further obtain the to-be-transmitted data distributed in the time-domain centralized distribution manner.

The network device sends the to-be-transmitted data distributed in the data distribution manner to the terminal device.

Operation S203: The terminal device receives processed to-be-transmitted data; and in one embodiment, the terminal device receives the processed to-be-transmitted data sent by the network device.

Specifically, the terminal device receives the to-be-transmitted data that is distributed in the data distribution manner and that is sent by the network device.

Operation S204: The terminal device determines the data distribution manner.

In one embodiment, if the network device and the terminal device have agreed on in advance a data distribution manner that is to be used, the terminal device uses the data distribution manner that is agreed on in advance.

In one embodiment, the terminal device may determine the data distribution manner based on a demodulation reference signal (DMRS) attribute. The DMRS attribute may be a DMRS pattern or a DMRS port number, and different DMRS attributes correspond to different data distribution manners.

The network device may send the DMRS attribute to the terminal device by using a plurality of types of signaling, for example, downlink control information (DCI), radio resource control (RRC) signaling, and a media access control (MAC) layer control element (CE). This is not limited in this embodiment of this application.

In one embodiment, the terminal device may determine the data distribution manner based on a preset first correspondence. Different DMRS patterns correspond to different data distribution manners, or different DMRS port numbers correspond to different data distribution manners. A DMRS pattern or a DMRS port number used when the network device and the terminal device transmit data is known. For example, the DMRS pattern is a first DMRS pattern or the DMRS port number is a first DMRS port number. The terminal device may determine, based on the first DMRS pattern or the first DMRS port number, a data distribution manner corresponding to the first DMRS pattern or the first DMRS port number in a plurality of data distribution manners. For example, the network device and the terminal device may agree that a port number x1-y1 indicates that the port number corresponds to the time-domain centralized data distribution manner, and a port number x2-y2 indicates that the port number corresponds to the time-domain decentralized data distribution manner. However, this is not limited in this embodiment of this application.

It should be understood that in addition to the DMRS pattern or the DMRS port number, the DMRS attribute may alternatively be a DMRS scrambling code or a DMRS orthogonal sequence. This is not limited in this embodiment of this application.

In one embodiment, the terminal device may determine the data distribution manner according to data distribution manner indication information sent by the network device.

The data distribution manner indication information is used to indicate the data distribution manner used by the network device, and may be DCI, RRC signaling, a MAC layer CE, or the like. This is not limited in this embodiment of this application.

In one embodiment, the terminal device may determine the data distribution manner based on a frame structure. The frame structure is used to indicate that a demodulation result needs to be fed back on a current resource unit (which may be specifically a current frame) or does not need to be fed back on a current resource unit. If the demodulation result needs to be fed back on the current resource unit, a corresponding data distribution manner is the time-domain centralized distribution manner; or if the demodulation result does not need to be fed back on the current resource unit, a corresponding data distribution manner is the time-domain decentralized distribution manner.

Operation S205: The terminal device performs demapping processing on the processed to-be-transmitted data in the data distribution manner, to obtain the to-be-transmitted data.

Specifically, the terminal device performs demapping processing on the processed to-be-transmitted data in the determined data distribution manner, to obtain the to-be-transmitted data.

If the network device performs interleaving processing on the to-be-transmitted data, and performs mapping processing on the to-be-transmitted data in the mapping sequence in which frequency-domain mapping is performed before time-domain mapping, the terminal device processes the received to-be-transmitted data in a demapping sequence in which frequency-domain demapping is performed before time-domain demapping, and performs de-interleaving processing.

If the network device performs mapping processing on the to-be-transmitted data in the mapping sequence in which time-domain mapping is performed before frequency-domain mapping, the terminal device processes the received to-be-transmitted data in a demapping sequence in which time-domain demapping is performed before frequency-domain demapping.

If the network device performs interleaving processing on the to-be-transmitted data, and performs mapping processing on the to-be-transmitted data in the mapping sequence in which time-domain mapping is performed before frequency-domain mapping, the terminal device processes the received to-be-transmitted data in a demapping sequence in which time-domain demapping is performed before frequency-domain demapping, and performs de-interleaving processing.

According to the embodiment described in FIG. 5, the network device performs interleaving processing on the to-be-transmitted data, or performs mapping processing in a mapping sequence, or performs interleaving processing on the to-be-transmitted data and performs mapping processing in a mapping sequence. Different data distribution manners may be obtained for different processing manners. Therefore, the data distribution manner in which data is centrally distributed and the data distribution manner in which data is de-centrally distributed can be achieved, and may be applied to a system having a plurality of application scenarios.

In one embodiment, the network device may perform interleaving processing on the to-be-transmitted data before performing layer mapping, that is, an interleaving module may be added between the modulation module and the layer mapping module shown in FIG. 1. The interleaving module is configured to implement frequency-domain interleaving, time-domain interleaving, or time-frequency interleaving, and a specific type of interleaving to be implemented is determined based on a specific case.

Specifically, $d(m)$, $m=0, \ldots, M\ 1$, where $d(m)$ indicates each modulated symbol in a codeword before the layer mapping module, and $m$ indicates a sequence number of the modulated symbol in the codeword. An interleaving process is as follows:

$$d'(i)=d(f(i,M_{symbol},M'_{symbol},N_{CB},N_{CBSize},nLayer)),$$
where $M_{symbol}$ indicates a parameter related to a quantity of OFDM symbols in a resource unit or a quantity of OFDM symbols that can be used for transmitting a PDSCH, $M'_{symbol}$ indicates a parameter related to a quantity of OFDM symbols in the Q parts or the quantity of OFDM symbols that can be used for transmitting a PDSCH, $N_{CB}$ indicates a parameter related to a quantity of CBs in the $j^{th}$ part of the Q parts, $N_{CBSize}$ indicates a parameter related to a size of the CB, and nLayer indicates a quantity of scheduled flows.

In one embodiment, the network device may perform interleaving processing on the to-be-transmitted data after performing layer mapping, that is, an interleaving module may be added between the layer mapping module and the precoding module shown in FIG. 1. The interleaving module is configured to implement frequency-domain interleaving, time-domain interleaving, or time-frequency interleaving, and a specific type of interleaving to be implemented is determined based on a specific case.

Specifically, $d(m)$, $m=0, \ldots, M\ 1$, where $d(m)$ indicates each modulated symbol in a codeword before the layer mapping module, and $m$ indicates a sequence number of the modulated symbol in the codeword. An interleaving process is as follows:

$$d'(i)=d(f(i,M_{symbol},M'_{symbol},N_{CB},N_{CBSize})), \text{ where}$$

$M_{symbol}$ indicates a parameter related to a quantity of OFDM symbols in a resource unit or a quantity of OFDM symbols that can be used for transmitting a PDSCH, $M'_{symbol}$ indicates a parameter related to a quantity of OFDM symbols in the Q parts or the quantity of OFDM symbols that can be used for transmitting a PDSCH, $N_{CB}$ indicates a parameter related to a quantity of CBs in the $j^{th}$ part of the Q parts, and $N_{CBSize}$ indicates a parameter related to a size of the CB.

In one embodiment, the network device may perform interleaving processing on the to-be-transmitted data when performing layer mapping, that is, the layer mapping module shown in FIG. 1 may be improved, to enable the layer mapping module to implement a function of layer mapping as well as functions of frequency-domain interleaving, time-domain interleaving, or time-frequency interleaving.

Specifically, an example in which one codeword is mapped to two layers is used as an example. In the LTE system, a layer mapping table in the time-domain centralized distribution manner is shown in the following Table 2. After the layer mapping module shown in FIG. 1 is improved, a layer mapping table in the time-domain decentralized distribution manner may be obtained, as shown in the following Table 3. In Table 3, $M_{symb}$ indicates a parameter related to a quantity of OFDM symbols in a resource unit or a quantity of OFDM symbols that can be used for transmitting a PDSCH, $M'_{symb}$ indicates a parameter related to a quantity of OFDM symbols in the Q parts or the quantity of OFDM symbols that can be used for transmitting a PDSCH, $N_{CB}$ indicates a parameter related to a quantity of CBs in the $j^{th}$ part of the Q parts, and $N_{CBsize}$ indicates a parameter related to a size of the CB. If Q=1, Table 3 in the time-domain decentralized distribution manner may be the following Table 4. In Table 4, $N_{CBNum}$ indicates a quantity of CBs in the resource unit, and $N_{CBsize}$ indicates a parameter related to a size of the CB.

TABLE 2

| Quantity of layers | Quantity of codewords | Codeword-to-layer mapping $i = 0, 1, K, M_{symb}^{layer} - 1$ |
|---|---|---|
| 2 | 1 | $x^{(0)}(i) = d^{(0)}(2i)$ $x^{(1)}(i) = d^{(0)}(2i + 1)$ $M_{symb}^{layer} = M_{symb}^{(0)}/2$ |

TABLE 3

| Quantity of layers | Quantity of codewords | Codeword-to-layer mapping $i = 0, 1, K, M_{symb}^{layer} - 1$ |
|---|---|---|
| 2 | 1 | $x^{(0)}(i) = d^{(0)}(f_0(i, M_{symb}, M_{symb}', N_{CB}, N_{CBsize}))$ $x^{(1)}(i) = d^{(0)}(f_1(i, M_{symb}, M_{symb}', N_{CB}, N_{CBsize}))$ $M_{symb}^{layer} = M_{sym}^{(0)}/2$ |

TABLE 4

| Quantity of layers | Quantity of codewords | Codeword-to-layer mapping $i = 0, 1, K, M_{symb}^{layer} - 1$ |
|---|---|---|
| 2 | 1 | $x^{(0)}(i) = d^{(0)}(\mod(i, N_{CBNum}) * N_{CBsize} + 2 * \mathrm{floor}(i/N_{CBNum}))$ $x^{(1)}(i) = d^{(1)}(\mod(i, N_{CBNum}) * N_{CBsize} + 2 * \mathrm{floor}(i/N_{CBNum}) + 1)$ $M_{symb}^{layer} = M_{sym}^{(0)}/2$ |

In one embodiment, the network device may perform interleaving processing on the to-be-transmitted data when performing resource element mapping, that is, the resource element mapping module shown in FIG. 1 is improved, to enable the resource element mapping module to implement a function of time-frequency mapping as well as functions of frequency-domain interleaving, time-domain interleaving, or time-frequency interleaving. In this case, a sequence of interleaving and time-frequency mapping may not be limited.

In one embodiment, the network device may perform, when performing resource element mapping, mapping processing on the to-be-transmitted data in the mapping sequence in which time-domain mapping is performed before frequency-domain mapping, that is, the resource element mapping module shown in FIG. 1 may be improved, to enable the resource element mapping module to implement the mapping sequence in which frequency-domain mapping is performed before time-domain mapping in the LTE system as well as the mapping sequence in which time-domain mapping is performed before frequency-domain mapping.

Specifically, complex symbols on each antenna are mapped to a scheduled resource (k, l). In a mapping process, an unavailable resource such as a physical broadcast channel (PBCH), a synchronization signal, or the like of a PDSCH/ physical uplink shared channel (PUSCH) is excluded.

A process in which frequency-domain mapping is performed before time-domain mapping may be: k is first added, and l is then added. k indicates a frequency domain subcarrier, and l indicates a time domain OFDM symbol.

A process in which time-domain mapping is performed before frequency-domain mapping may be: l is first added, and k is then added. k indicates a frequency domain subcarrier, and l indicates a time domain OFDM symbol.

In one embodiment, the network device may use a time-domain centralized distribution manner during initial transmission. The network device may use a time-domain decentralized distribution manner during retransmission.

In one embodiment, the network device may configure example diagrams of four DMRS patterns shown in FIG. 6a to FIG. 6d. When the demodulation result needs to be fed back on a current frame, the network device may use a corresponding DMRS attribute. The DMRS attribute may correspond to the time-domain centralized distribution manner. Example diagrams of the DMRS patterns shown in FIG. 6a and FIG. 6b may be configured as example diagrams of DMRS patterns used when the demodulation result needs to be fed back on the current frame, and a data distribution manner corresponding to the DMRS patterns shown in FIG. 6a and FIG. 6b may be the time-domain centralized distribution manner. On the contrary, when the demodulation result does not need to be fed back on the current frame, the network device may use a corresponding DMRS attribute. The DMRS attribute may correspond to the time-domain decentralized distribution manner. Example diagrams of DMRS patterns shown in FIG. 6c and FIG. 6d may be configured as example diagrams of DMRS patterns used when the demodulation result does not need to be fed back on the current frame, and a data distribution manner corresponding to both the DMRS patterns shown in FIG. 6c and FIG. 6d may be the time-domain decentralized distribution manner.

In one embodiment, when a DMRS pattern is that a DMRS occupies one time domain symbol, the DMRS pattern corresponds to the time-domain centralized distribution manner.

In one embodiment, when a DMRS pattern is that the DMRS occupies at least two time domain symbols, if no data transmission exists between any two time domain symbols occupied by the DMRS, the DMRS pattern corresponds to the time-domain centralized distribution manner; or if data transmission exists between the at least two time domain symbols occupied by the DMRS, the DMRS pattern corresponds to the time-domain decentralized distribution manner.

Figure 6A:
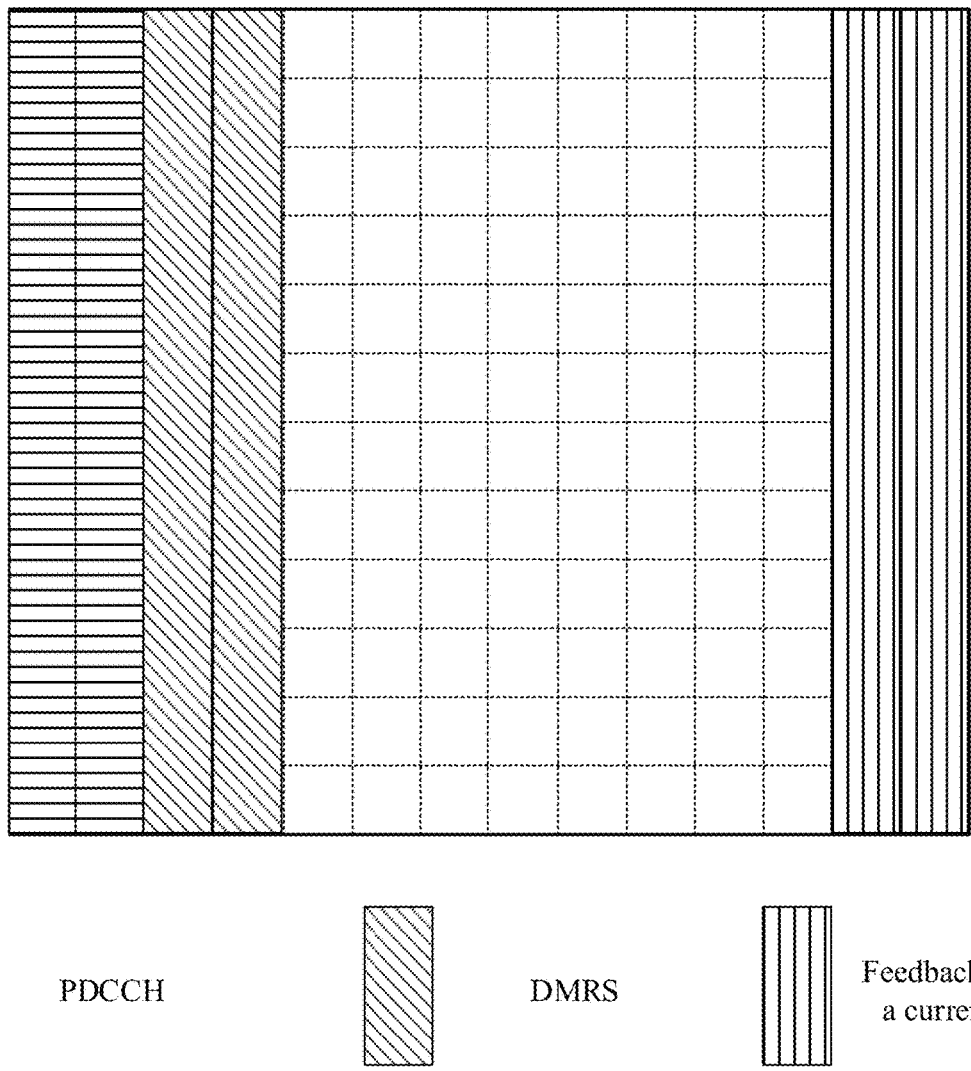
FIG. 6a is an example diagram of a pattern of a demodulation reference signal.
Figure 6B:
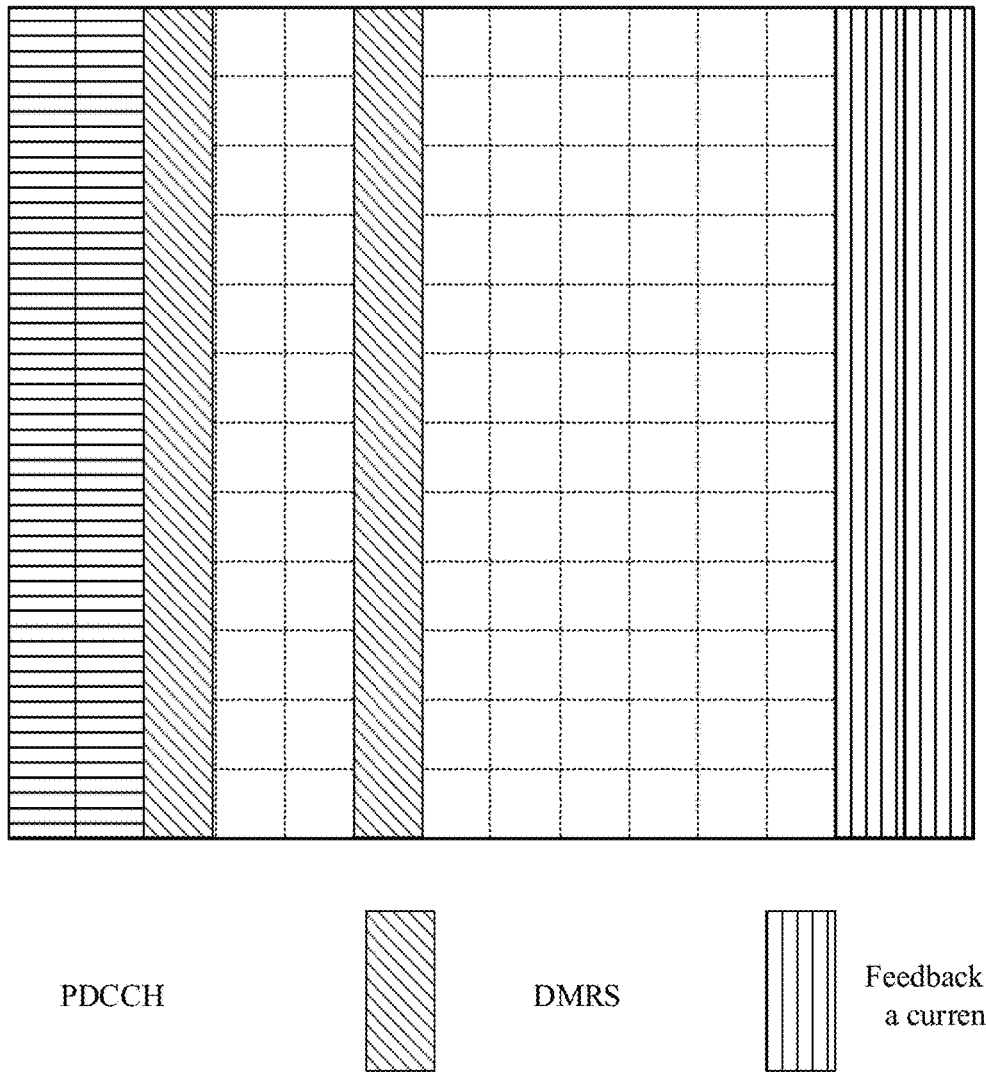
FIG. 6b is an example diagram of a pattern of another demodulation reference signal.
Figure 6C:
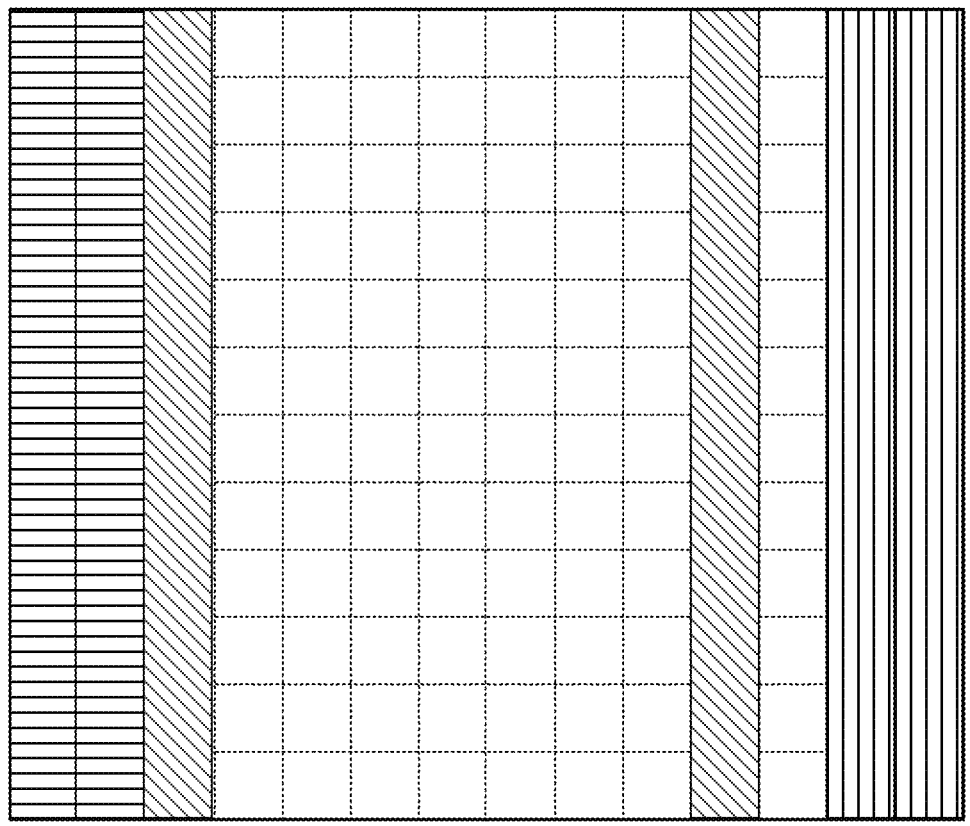
FIG. 6c is an example diagram of a pattern of still another demodulation reference signal.
Figure 6C:
Figure 6C:
Figure 6C:
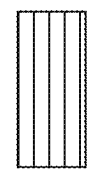
Figure 6D:
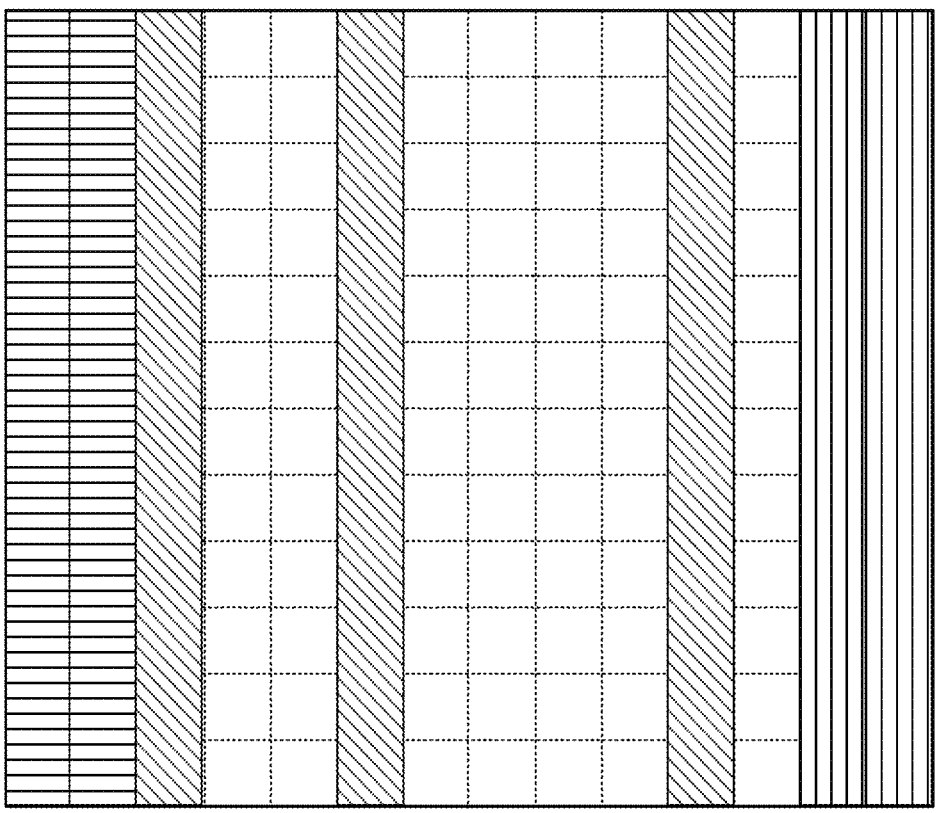
FIG. 6d is an example diagram of a pattern of still another demodulation reference signal.
Figure 6D:
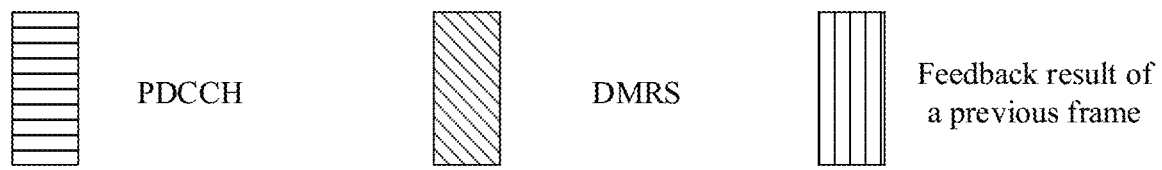

Specifically, when a DMRS pattern is that the DMRS occupies one time domain symbol, the DMRS pattern corresponds to the time-domain centralized distribution manner. When the DMRS pattern is that the DMRS occupies at least two time domain symbols, if the DMRS pattern is that no data transmission exists between any two time domain symbols occupied by the DMRS, in other words, no data transmission exists between time domain symbols of any two DMRSs, the DMRS pattern may correspond to the time-domain centralized distribution manner. FIG. 6a is an example diagram of a DMRS pattern used when DMRS transmission is performed before data transmission. A data distribution manner corresponding to the DMRS pattern shown in FIG. 6a may be the time-domain centralized distribution manner. If data transmission exists between at least two of the time domain symbols occupied by the DMRS, in other words, data transmission exists between time domain symbols of two DMRSs, a data distribution manner corresponding to the DMRS pattern may be the time-domain decentralized distribution manner. In the example diagrams of the DMRS patterns in FIG. 6b, FIG. 6c, and FIG. 6d, DMRS transmission is performed after data transmission. Therefore, the data distribution manners corresponding to the three DMRS patterns may all be the time-domain decentralized distribution manner.

In conclusion, the following two different manners may be used for a correspondence between a data distribution manner and a DMRS pattern.

Manner 1: In the DMRS pattern (FIG. 6a) applicable to a case in which no data transmission exists between transmission of any two DMRSs, the time-domain centralized distribution manner is used; and in the DMRS pattern (FIG. 6b, FIG. 6c, and FIG. 6d) applicable to a case in which data transmission exists between transmission of two DMRSs, the time-domain decentralized distribution manner is used.

Manner 2: In the DMRS pattern (FIG. 6a and FIG. 6b) applicable to a case in which the demodulation result needs to be fed back on the current resource unit, the time-domain centralized distribution manner is used; and in the DMRS pattern (FIG. 6c and FIG. 6d) applicable to a case in which the demodulation result does not need to be fed back on the current resource unit, the time-domain decentralized distribution manner is used.

It should be understood that using which manner depends on the application scenario or a service requirement of the terminal device, and the manner is configured by the network device. This is not limited in this embodiment of this application.

The method in the embodiments of this application is described above in detail, and apparatuses provided in embodiments of this application are described below.

Figure 7:
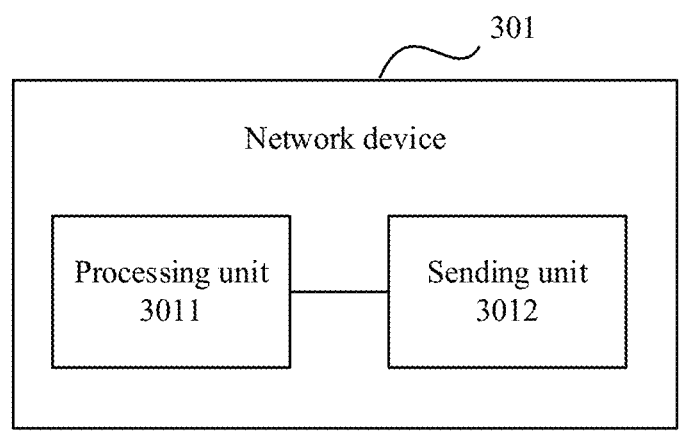
FIG. 7 is a block diagram of a logical structure of a network device according to an embodiment of this application.

FIG. 7 is a block diagram of a logical structure of a network device 301 according to an embodiment of the present invention. The network device 301 may include a processing unit 3011 and a sending unit 3012.

The processing unit 3011 is configured to process to-be-transmitted data to obtain a data distribution manner, where the processing includes at least one of interleaving processing and mapping processing that is performed in a mapping sequence; the data distribution manner is used to indicate distribution of data from a same code block; and when the processing includes only mapping processing performed in a mapping sequence, the mapping sequence does not include a mapping sequence in which space-domain mapping is first performed, frequency-domain mapping is then performed, and time-domain mapping is finally performed.

The sending unit 3012 is configured to send the to-be-transmitted data distributed in the data distribution manner.

It should be noted that the processing unit 3011 may be configured to perform operation S201 in the method embodiment shown in FIG. 5, and the sending unit 3012 may be configured to perform operation S202 in the method embodiment shown in FIG. 5.

Figure 8:
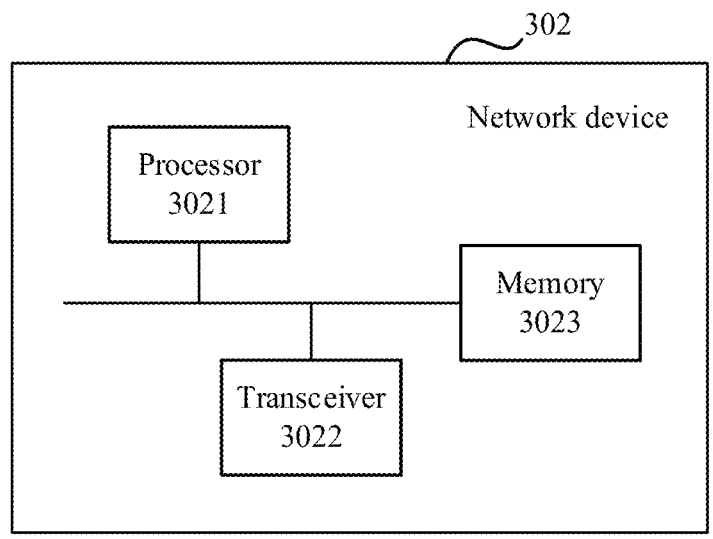
FIG. 8 is a block diagram of a physical structure of a network device according to an embodiment of this application.

FIG. 8 shows a network device 302 according to an embodiment of this application. The network device 302 includes a processor 3021, a transceiver 3022, and a memory 3023. The processor 3021, the memory 3023, and the transceiver 3022 are connected to each other by using a bus.

The memory 3023 includes, but is not limited to, a random access memory (RAM), a read-only memory (ROM), an erasable programmable read-only memory (EPROM), or a portable read-only memory (CD-ROM). The memory 3023 is configured to store a related instruction and related data.

The transceiver 3022 may be a communications module or a transceiver circuit, and is configured to transmit information such as data and signaling between the network device and a terminal device. In this embodiment of this application, the transceiver 3022 is configured to perform operation S202 in the method embodiment shown in FIG. 5.

The processor 3021 may be a controller, a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor 3021 may implement or execute various example logical blocks, modules, and circuits described with reference to content disclosed in the embodiments of this application. Alternatively, the processor 3021 may be a combination of processors implementing a computing function, for example, a combination including one or more microprocessors, or a combination of the DSP and a microprocessor. In this embodiment of this application, the processor 3021 is configured to perform operation S201 in the embodiment shown in FIG. 5.

Figure 9:
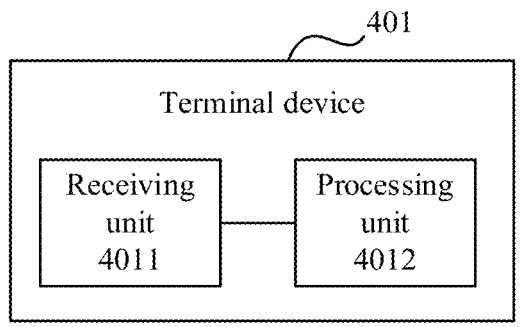
FIG. 9 is a block diagram of a logical structure of a terminal device according to an embodiment of this application.

FIG. 9 is a block diagram of a logical structure of a terminal device according to an embodiment of this application. The terminal device 401 may include a receiving unit 4011 and a processing unit 4012.

The receiving unit 4011 is configured to receive processed to-be-transmitted data; and the processing unit is configured to determine a data distribution manner, where the data distribution manner is used to indicate distribution of data from a same code block.

The processing unit 4012 is further configured to perform de-processing on the processed to-be-transmitted data in the data distribution manner, to obtain the to-be-transmitted data.

The de-processing includes at least one of de-interleaving processing performed on the processed to-be-transmitted data and demapping processing performed in a demapping sequence; and when the de-processing includes only demapping processing performed in a demapping sequence, the demapping sequence does not include a demapping sequence in which space-domain demapping is first performed, frequency-domain demapping is then performed, and time-domain demapping is finally performed.

It should be noted that the receiving unit 4011 may be configured to perform operation S203 in the method embodiment shown in FIG. 5, and the processing unit 4012 may be configured to perform operation S204 and operation S205 in the method embodiment shown in FIG. 5.

Figure 10:
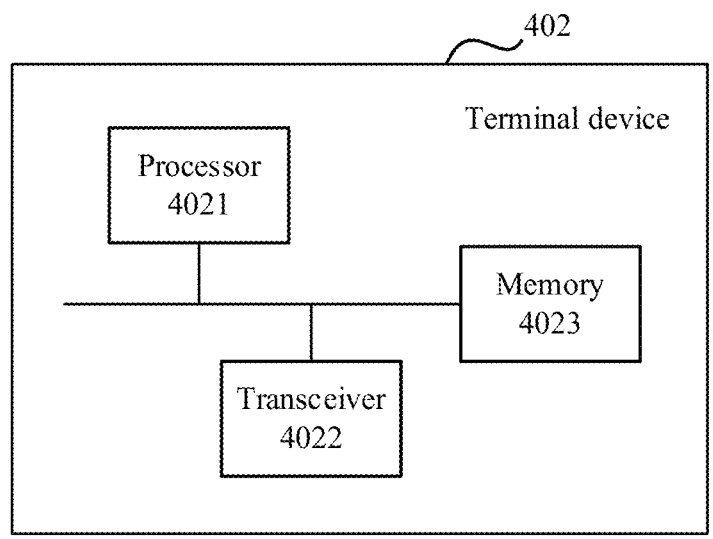
FIG. 10 is a block diagram of a physical structure of a terminal device according to an embodiment of this application.

FIG. 10 shows a terminal device 402 according to an embodiment of this application. The terminal device 402 includes a processor 4021, a transceiver 4022, and a memory 4023. The processor 4021, the memory 4023, and the transceiver 4022 are connected to each other by using a bus.

The memory 4023 includes, but is not limited to, a RAM, a ROM, an EPROM, or a CD-ROM. The memory 4023 is configured to store a related instruction and related data.

The transceiver 4022 may be a communications module or a transceiver circuit, and is configured to transmit information such as data and signaling between a network device and the terminal device. In this embodiment of this application, the transceiver 4022 is configured to perform operation S203 in the method embodiment shown in FIG. 5.

The processor 4021 may be a controller, a CPU, a general purpose processor, a DSP, an ASIC, an FPGA, or another programmable logic device, a transistor logic device, a hardware component, or any combination thereof. The processor may implement or execute various example logical blocks, modules, and circuits described with reference to content disclosed in the embodiments of this application. Alternatively, the processor 4021 may be a combination of processors implementing a computing function, for example, a combination including one or more microprocessors, or a combination of the DSP and a microprocessor. In this embodiment of this application, the processor 4021 is configured to perform operation S204 and operation S205 in the embodiment shown in FIG. 5.

In one embodiment, the operations in the foregoing method can be completed by using a hardware integrated logical circuit in the processor, or by using an instruction in a form of software. The operations of the method disclosed with reference to the embodiments of this application may be directly performed by a hardware processor, or may be performed and completed by using a combination of hardware in the processor and a software unit. The software unit may be located in a mature storage medium in the art, such as a random access memory, a flash memory, a read-only memory, a programmable read-only memory, an electrically erasable programmable memory, or a register. The storage medium is located in the memory. The processor executes the instruction in the memory and completes the operations in the foregoing method in combination with hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that method operations and units described with reference to the embodiments disclosed in this specification may be implemented by electronic hardware, computer software, or a combination thereof. To clearly describe the interchangeability between the hardware and the software, the foregoing has generally described operations and compositions of each embodiment according to functions. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not repeatedly described herein.

In the several embodiments provided in this application, it should be understood that the disclosed system, apparatus, and method may be implemented in another manner. For example, the described apparatus embodiment is merely an example. For example, the unit division is merely a logical function division and there may be other divisions in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, electrical connections, mechanical connections, or connections in other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions in the embodiments of this application.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or all or some of the technical solutions may be implemented in the form of a software product. The computer software product is stored in a storage medium and includes several instructions for instructing a computer device (which may be a personal computer, a server, a network device, or the like) to perform all or some of the operations of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any equivalent modification or replacement readily figured out by a person skilled in the art is within the technical scope disclosed in this application and shall fall within the protection scope of this application. Therefore, the protection scope of this application shall be subject to the protection scope of the claims.

What is claimed is:

1. A data processing method, comprising:
receiving, by a terminal device, received data, wherein the received data is distributed from to-be-transmitted data of a code block in a data distribution manner;
determining, by the terminal device, the data distribution manner, wherein the data distribution manner is used to indicate that the to-be-transmitted data from the same code block is centrally distributed on at least one consecutive time domain symbol of the received data; and
processing, by the terminal device, the received data in accordance with the data distribution manner, to obtain the to-be-transmitted data, wherein
the processing comprises at least one of de-interleaving and demapping performed on the received data, and wherein when the processing comprises only demapping without de-interleaving, the demapping is performed in a demapping sequence selected from one of a plurality of sequences of space-domain mapping, frequency-domain mapping, and time-domain mapping that exclude a demapping sequence in which space-domain demapping is first performed, frequency-domain demapping is then performed, and time-domain demapping is finally performed.

2. The method according to claim 1, wherein the data distribution manner is used to indicate that the to-be-transmitted data from the same code block is de-centrally distributed over a plurality of time domain symbols of the received data.

3. The method according to claim 1, wherein the processing, by the terminal device, the received data in accordance with the data distribution manner comprises:
- demapping, by the terminal device, the received data in a demapping sequence in which frequency-domain demapping is performed before time-domain demapping, followed by de-interleaving; or
- demapping, by the terminal device, the received data in a demapping sequence in which time-domain demapping is performed before frequency-domain demapping; or
- demapping, by the terminal device, the received data in a demapping sequence in which time-domain demapping is performed before frequency-domain demapping, followed by de-interleaving.

4. The method according to claim 3, wherein when demapping, by the terminal device, the received data in a demapping sequence in which frequency-domain demapping is performed before time-domain demapping, followed by de-interleaving, the de-interleaving comprises frequency-domain de-interleaving and the received data comprises the to-be-transmitted data that is centrally distributed on at least one consecutive time domain symbol of the received data.

5. The method according to claim 3, wherein when demapping, by the terminal device, the received data in a demapping sequence in which frequency-domain demapping is performed before time-domain demapping, followed by de-interleaving, the de-interleaving comprises time-domain de-interleaving or time-frequency-domain de-interleaving and the received data comprises the to-be-transmitted data that is de-centrally distributed over a plurality of time domain symbols of the received data.

6. The method of claim 1, wherein determining, by the terminal device, the data distribution manner comprises determining the data distribution manner based on a demodulation reference signal (DMRS) attribute.

7. A network device, comprising:
- a processor configured to process to-be-transmitted data in accordance with a data distribution manner, wherein the data distribution manner is used to indicate that the to-be-transmitted data from the same code block is centrally distributed on at least one consecutive time domain symbol after the processing, wherein to process the to-be-transmitted data the processor is configured to perform processing that comprises at least one of interleaving and mapping, wherein the data distribution manner indicates a distribution of the to-be-transmitted data from a same code block, and wherein when the processing comprises only mapping without interleaving, the mapping is performed in a mapping sequence selected from one of a plurality of sequences of space-domain mapping, frequency-domain mapping, and time-domain mapping that excludes a mapping sequence in which space-domain mapping is first performed, frequency-domain mapping is then performed, and time-domain mapping is finally performed; and
- a transceiver configured to send the to-be-transmitted data distributed in the data distribution manner.

8. The network device according to claim 7, wherein the data distribution manner is used to indicate that the to-be-transmitted data from the same code block is de-centrally distributed over a plurality of time domain symbols after the processing.

9. The network device according to claim 7, wherein to perform the processing that comprises at least one of interleaving and mapping, the processor is configured to perform operations that comprise:
- interleaving the to-be-transmitted data, and mapping the to-be-transmitted data in a mapping sequence in which frequency-domain mapping is performed before time-domain mapping; or
- mapping the to-be-transmitted data in a mapping sequence in which time-domain mapping is performed before frequency-domain mapping, to de-centrally distribute the to-be-transmitted data; or
- interleaving the to-be-transmitted data, and mapping the to-be-transmitted data in a mapping sequence in which time-domain mapping is performed before frequency-domain mapping, to de-centrally distribute the to-be-transmitted data.

10. The network device according to claim 9, wherein to perform the operation that comprises interleaving the to-be-transmitted data, and mapping the to-be-transmitted data in a mapping sequence in which frequency-domain mapping is performed before time-domain mapping, the processor is configured to perform operations that comprise:
- frequency-domain interleaving the to-be-transmitted data; and
- mapping the to-be-transmitted data in the mapping sequence in which frequency-domain mapping is performed before time-domain mapping, to centrally distribute the to-be-transmitted data.

11. The network device according to claim 9, wherein to perform the operation that comprises interleaving the to-be-transmitted data, and mapping the to-be-transmitted data in a mapping sequence in which frequency-domain mapping is performed before time-domain mapping, the processor is configured to perform operations that comprise:
- time-domain interleaving or time-frequency-domain interleaving the to-be-transmitted data; and
- mapping the to-be-transmitted data in the mapping sequence in which frequency-domain mapping is performed before time-domain mapping, to de-centrally distribute the to-be-transmitted data.

12. The network device according to claim 7, wherein to perform the processing that comprises at least one of interleaving and mapping, the processor is further configured to perform operations that comprise:
- interleaving the to-be-transmitted data before or after performing layer mapping.

13. The network device according to claim 7, wherein to perform the processing that comprises at least one of interleaving and mapping, the processor is further configured to perform operations that comprise:
- interleaving to-be-transmitted data when performing layer mapping or resource element mapping.

14. The network device according to claim 13, wherein to perform the operations that comprises performing resource element mapping, the processor is configured to perform operations that comprise:
- mapping the to-be-transmitted data in a mapping sequence in which time-domain mapping is performed before frequency-domain mapping.

15. A terminal device, comprising:
- a transceiver configured to receive received data, wherein the received data is distributed from to-be-transmitted data of a code block in a data distribution manner; and
- a processor configured to:
  - determine the data distribution manner, wherein the data distribution manner is used to indicate that the to-be-transmitted data from the same code block is centrally distributed on at least one consecutive time domain symbol of the received data; and process the received data in accordance with the data distribution manner, to obtain the to-be-transmitted data, wherein to process the received data in accordance with the data distribution manner, the processor is configured to perform operations that comprise at least one of de-interleaving and demapping performed on the received data, and wherein when the operations comprise only demapping without de-interleaving, the demapping is performed in a demapping sequence selected from one of a plurality of sequences of space-domain mapping, frequency-domain mapping, and time-domain mapping that exclude a demapping sequence in which space-domain demapping is first performed, frequency-domain demapping is then performed, and time-domain demapping is finally performed.

16. The terminal device according to claim 15, wherein the data distribution manner is used to indicate that the to-be-transmitted data from the same code block is de-centrally distributed over a plurality of time domain symbols of the received data.

17. The terminal device according to claim 15, wherein to perform operations that comprise at least one of de-interleaving and demapping performed on the received data, the processor is configured to:
    demap the received data in a demapping sequence in which frequency-domain demapping is performed before time-domain demapping, followed by de-interleaving; or
    demap the received data in a demapping sequence in which time-domain demapping is performed before frequency-domain demapping; or
    demap the received data in a demapping sequence in which time-domain demapping is performed before frequency-domain demapping, followed by de-interleaving.

18. The terminal device according to claim 17, wherein to demap the received data in a demapping sequence in which frequency-domain demapping is performed before time-domain demapping, followed by de-interleaving, the processor is configured to perform frequency-domain de-interleaving and the received data comprises the to-be-transmitted data that is centrally distributed on at least one consecutive time domain symbol of the received data.

19. The terminal device according to claim 17, wherein to demap the received data in a demapping sequence in which frequency-domain demapping is performed before time-domain demapping, followed by de-interleaving, the processor is configured to perform time-domain de-interleaving or time-frequency-domain de-interleaving and the received data comprises the to-be-transmitted data that is de-centrally distributed over a plurality of time domain symbols of the received data.

20. The terminal device according to claim 15, wherein to determine the data distribution manner, the processor is configured to determine the data distribution manner based on a demodulation reference signal (DMRS) attribute.

* * * * *